United States Patent
Pihlaja (10) Patent No.: US 6,243,364 B1
(45) Date of Patent: Jun. 5, 2001

(54) UPSTREAM ACCESS METHOD IN BIDIRECTIONAL TELECOMMUNICATION SYSTEM

(75) Inventor: Juha Pihlaja, Espoo (FI)

(73) Assignee: Nokia Multimedia Network Terminals Ltd., Helsinki (FI)

( * ) Notice: Subject to any disclaimer, the term of this patent is extended or adjusted under 35 U.S.C. 154(b) by 0 days.

(21) Appl. No.: 09/068,211

(22) PCT Filed: Nov. 7, 1996

(86) PCT No.: PCT/FI96/00601
§ 371 Date: Sep. 23, 1998
§ 102(e) Date: Sep. 23, 1998

(87) PCT Pub. No.: WO97/17778
PCT Pub. Date: May 15, 1997

(30) Foreign Application Priority Data

Nov. 7, 1995 (FI) .......................................... 955358
Dec. 5, 1995 (FI) .......................................... 955869

(51) Int. Cl.[7] .............................. H04J 3/16; H04L 29/06; H04B 7/212
(52) U.S. Cl. ...................... 370/294; 370/395; 370/443; 370/445; 370/459; 370/462
(58) Field of Search .................................. 370/252, 280, 370/294, 389, 395, 442, 443, 444, 445, 458, 459, 462; 348/6, 7, 10, 12; 455/3.1, 5.1

(56) References Cited

U.S. PATENT DOCUMENTS

| | | | |
|---|---|---|---|
| 5,341,366 | 8/1994 | Soumiya et al. ...................... | 370/17 |
| 5,425,027 | 6/1995 | Baran ................................... | 370/69.1 |
| 5,761,197 | * 6/1998 | Takefman ............................. | 370/337 |
| 5,850,400 | * 12/1998 | Eames et al. ........................ | 370/443 |
| 5,917,822 | * 6/1999 | Lyles et al. .......................... | 370/395 |
| 5,966,163 | * 10/1999 | Lin et al. .............................. | 348/12 |

FOREIGN PATENT DOCUMENTS

| | | |
|---|---|---|
| 0 616 478 A2 | 9/1994 | (EP) . |
| 0 658 992 A1 | 6/1995 | (EP) . |
| 0 691 760 A2 | 1/1996 | (EP) . |
| 0 702 470 | 3/1996 | (EP) . |
| 06030020 | 7/1992 | (JP) . |
| WO 95/31875 | 11/1995 | (WO) . |

* cited by examiner

*Primary Examiner*—Alpus H. Hsu
(74) *Attorney, Agent, or Firm*—Pillsbury Winthrop LLP (57) ABSTRACT

A method for allocating control time slots to terminals in a multipoint system based on time-division data transmission. Specific grant numbers are allocated to the terminals in downstream time slots. One grant number is associated with a grant to send information, such as one ATM cell, in corresponding upstream time slots. The terminal may be forbidden by means of a grant number to send in a certain time slot, or the time slot may be called a slotted Aloha time slot or a measurement time slot used for timing advance adjustment. The network terminal sends grant numbers at a predetermined rate to each terminal or sends grant numbers on the basis of how much information the terminals report needs to be sent. ATM channels are accessed rapidly and allocated efficiently, and a short access delay for a speech channel is achieved.

25 Claims, 6 Drawing Sheets

| Bit number / Alternate frames | 1 | 2 | 3 | 4 | 5 | 6 | 7 | 8 |
|---|---|---|---|---|---|---|---|---|
| Frame containing the frame alignment signal | Si (Note 1) | 0 | 0 | 1 | 1 | 0 | 1 | 1 |
| | | \multicolumn{7}{c|}{Frame alignment signal} | | | | | | | |
| Frame not containing the frame alignment signal | Si (Note 1) | 1 (Note 2) | A (Note 3) | $S_{a4}$ | $S_{a5}$ | $S_{a6}$ | $S_{a7}$ | $S_{a8}$ |
| | | | | \multicolumn{5}{c|}{(Note 4)} | | | | |

FIG. 2B

| Sub-multiframe (SMF) | Frame number | \multicolumn{8}{c}{Bits 1 to 8 of the frame} |
| | | 1 | 2 | 3 | 4 | 5 | 6 | 7 | 8 |
|---|---|---|---|---|---|---|---|---|---|
| I (Multi-frame) | 0 | $C_1$ | 0 | 0 | 1 | 1 | 1 | 1 | 1 |
| | 1 | 0 | 1 | A | $S_{a4}$ | $S_{a5}$ | $S_{a6}$ | $S_{a7}$ | $S_{a8}$ |
| | 2 | $C_2$ | 0 | 0 | 1 | 1 | 1 | 1 | 1 |
| | 3 | 0 | 1 | A | $S_{a4}$ | $S_{a5}$ | $S_{a6}$ | $S_{a7}$ | $S_{a8}$ |
| | 4 | $C_3$ | 0 | 0 | 1 | 1 | 1 | 1 | 1 |
| | 5 | 0 | 1 | A | $S_{a4}$ | $S_{a5}$ | $S_{a6}$ | $S_{a7}$ | $S_{a8}$ |
| | 6 | $C_4$ | 0 | 0 | 1 | 1 | 1 | 1 | 1 |
| | 7 | 0 | 1 | A | $S_{a4}$ | $S_{a5}$ | $S_{a6}$ | $S_{a7}$ | $S_{a8}$ |
| II | 8 | $C_1$ | 0 | 0 | 1 | 1 | 1 | 1 | 1 |
| | 9 | 1 | 1 | A | $S_{a4}$ | $S_{a5}$ | $S_{a6}$ | $S_{a7}$ | $S_{a8}$ |
| | 10 | $C_2$ | 0 | 0 | 1 | 1 | 1 | 1 | 1 |
| | 11 | 1 | 1 | A | $S_{a4}$ | $S_{a5}$ | $S_{a6}$ | $S_{a7}$ | $S_{a8}$ |
| | 12 | $C_3$ | 0 | 0 | 1 | 1 | 1 | 1 | 1 |
| | 13 | E | 1 | A | $S_{a4}$ | $S_{a5}$ | $S_{a6}$ | $S_{a7}$ | $S_{a8}$ |
| | 14 | $C_4$ | 0 | 0 | 1 | 1 | 1 | 1 | 1 |
| | 15 | E | 1 | A | $S_{a4}$ | $S_{a5}$ | $S_{a6}$ | $S_{a7}$ | $S_{a8}$ |

UPSTREAM ACCESS METHOD IN BIDIRECTIONAL TELECOMMUNICATION SYSTEM

FIELD OF THE INVENTION

The invention relates to distribution of audiovisual services to several receivers. The services are interactive in which case the receiver may send messages in the direction of the transmission network. The invention relates especially to an upstream access method in a cable TV system.

BACKGROUND OF THE INVENTION

Figure 1:
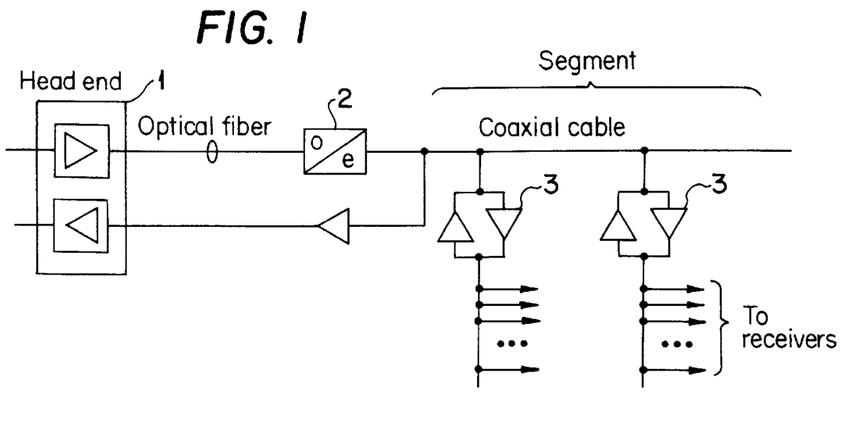
FIG. 1 illustrates a cable TV system.

Fixed networks can be used for distributing audiovisual services to receivers with a coaxial cable and/or an optical cable, radio networks or distribution via satellite as a physical transmission link. As an example of a fixed network, FIG. 1 illustrates a schematic view of one cable TV system. In the system a central site 1 is referred to as Head End where the received transmission is distributed to several physical signal paths, in this case to various optical fibres on which the emission is carried closer to consumers. The optical signal near a consumer is converted into an electric signal in a converter 2 and conducted to a coaxial cable having several branch circuits. In the branch circuit the signal is amplified and the amplified signal is then conducted to several receivers, that is, the coaxial cable is branched to several homes and it is further connected to the receiver. Downstream, that is, from the network equipment towards the terminal information is transmitted encrypted or non-encrypted. The frequency band of the system may extend as far as 1 GHz while the channel width is typically 8 MHz. Upper limit frequency is determined by the characteristics of amplifiers 3 (FIG. 1) placed in the cables branching from the coaxial trunk cable. One analog channel or about ten digital channels can be placed in this channel width of 8 MHz if the transmission rate is 38 Mbits, in which case 10 MPEG2 encoded video transmissions can be sent on one band of 8 MHz. Downstream control channels are placed in the frequency range of 70 to 130 MHz. Upstream control channels are placed in the frequency range of 5 to 55 MHz.

A method can be used in this system where both downstream and upstream transmission take place in time slots which are numbered starting from zero and ending in some figure max., after which the numbering may start again. ATM cells, for example, can be transmitted in time slots. Time slots o, . . . , max. can be thought to form a frame. In order that the terminals would be able to send information upwards, the time slots where they are allowed to send have to be reported to them in some way. The simplest way is to report in a separate signalling message to each terminal the time slots where it is allowed to send. A disadvantage of this method is that allocation of time slots by terminal equipment signalling messages is rather slow as there may be hundreds or even thousands of terminals. If numbering has to be changed considerably, a new signalling message has to be sent to all terminal equipment, which is a slow process.

Figure 2A:
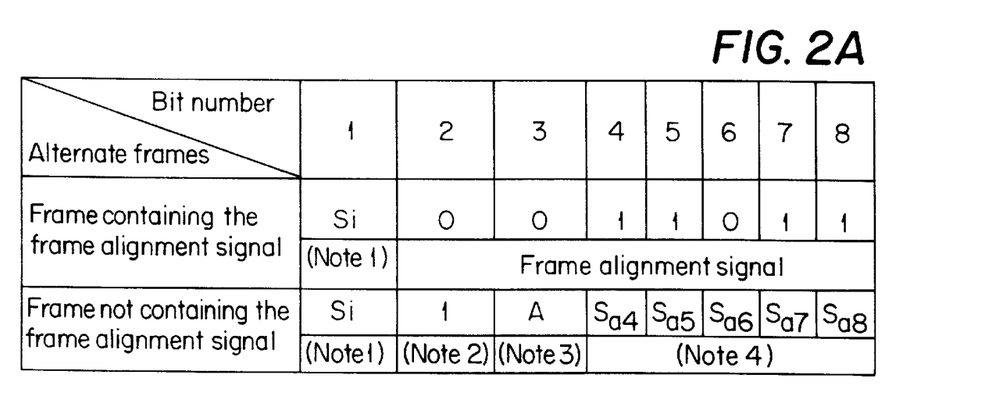
FIG. 2A illustrates the first byte of a frame according to G.704 recommendation.

A broadcast system has been presented in the field where the downstream frame structure is based on ITU-T recommendation G.704 (1544 kbit/s). The present application introduces the use of a frame of recommendation G.704 comprising 256 bits (32 bytes) numbered from 1 to 256, the repetition rate of the frames being 8000 Hz, in which case the bit rate will be 2048 kbit/s. The first eight bits of the frame have specified values depending on whether or not the frame contains a frame synchronization signal. The values of bits in a byte are shown in the table of FIG. 2A. Bit $S_i$ is reserved for international use but within the country its use is free, wherefore it is used in frames not containing the synchronization signal in multiframe structures and in CRC-4 error correction. Bit A is reserved e.g. for a remote alarm indicator and bits $S_{a4}$, $S_{a5}$, $S_{a6}$, $S_{a7}$ and $S_{a8}$ are reserved for future use.

Figure 3A:
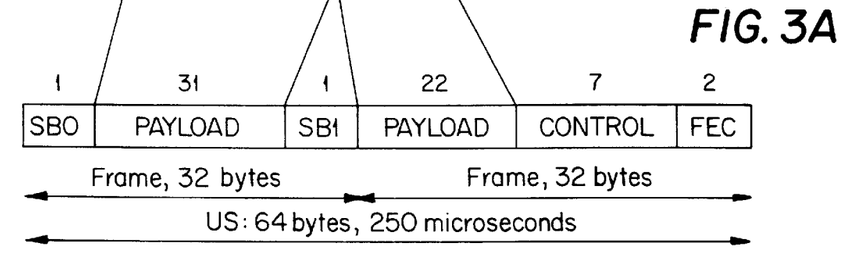
FIG. 3A shows a DSS slot.

In the way presented by the Applicant, downstream time slot DSS in Broadcast system will be formed of two consecutive frames according to G.704, FIG. 3A. The first byte of the first frame is indicated by SB0 and its bits are synchronization bits, i.e. $S_i$, 0, 0, 1, 1, 0, 1, 1 intended for the frame included in the frame synchronization of Table 1A. The payload is placed in the remaining 31 bytes of the frame. The first byte of the second frame is indicated by SB1 and the bits are the bits of FIG. 2A which are intended for the frame not containing the frame synchronization signal. This is followed by 22 bytes intended for the payload and at the end, the CONTROL field intended for downstream control bits and the FEC field intended for error correction bits. The lengths of the last two fields can be selected freely. A DSS time slot thus comprises 64 bytes and the duration of a time slot is 250 microseconds. A downstream signal is a constant rate bit stream where frames follow one another and 4,000 cells are transmitted per second.

Figure 2B:
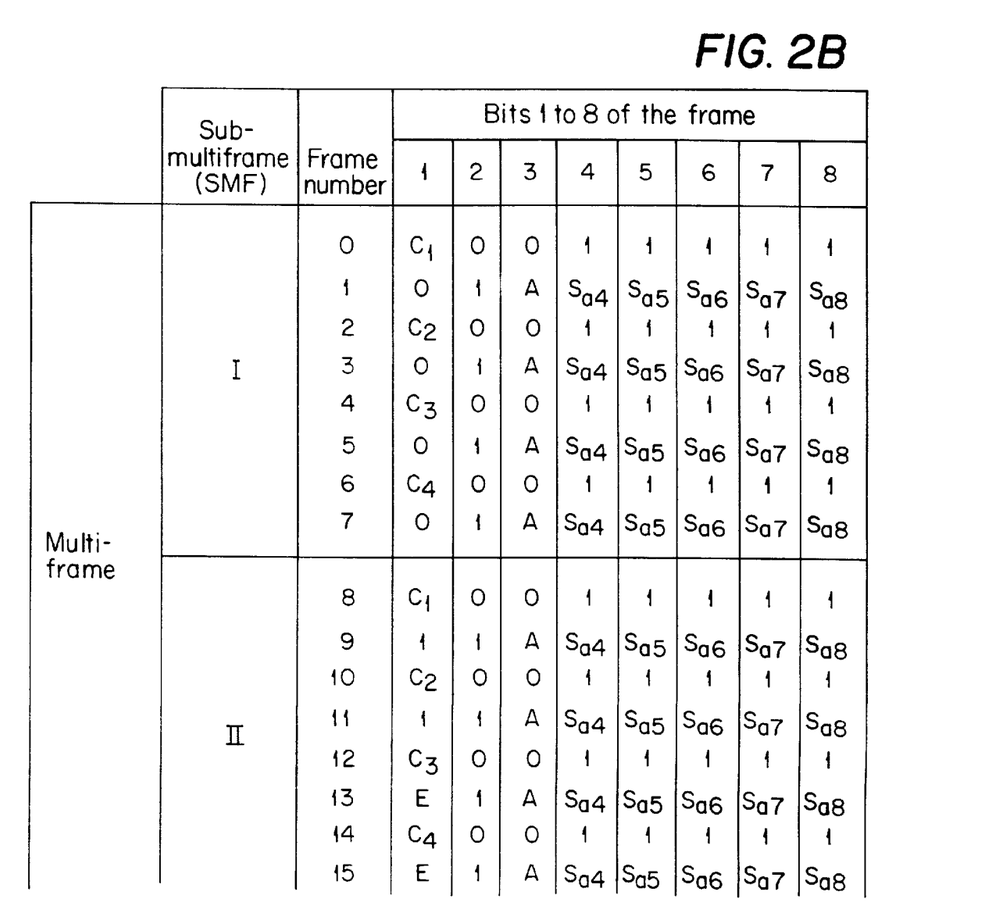
FIG. 2B illustrates a multiframe according to G.704 recommendation.
Figure 3B:
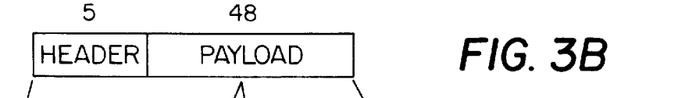
FIG. 3B illustrates insertion of an ATM cell between the DSS.
Figure 3C:
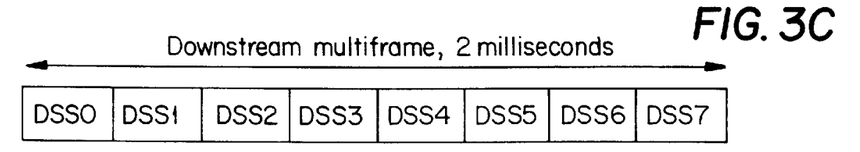
FIG. 3C shows a DSS multiframe.

Eight consecutive time slots DSS form a multiframe as shown in FIG. 3C. The duration of a multiframe is 2 milliseconds. The time slots are numbered from 0 to 7. The structure of the multiframe according to G.704 recommendation is shown in the table of FIG. 2B. The first four DSS time slots, that is, frames 0 to 7, form the first part SMF 1 (Sub-Multiframe) of the multiframe and frames 8 to 15 the second part SMF II. The table shows the first bits of each frame. The first byte of even-numbered frames contains the frame synchronization bits shown in the upper part of FIG. 2a, each first bit $C_1$, . . . $C_4$ forming a bit group of CRC-4. In SMF I the bits of the first byte of odd-numbered frames are as shown in the lower part of FIG. 2A when the first bit is 0. In SMF II the first bit in frames 9 and 11 is 1, whereas the first bit E in frames 13 and 15 is permanently one. At the beginning the value of the indicator is 0.

Figure 4:
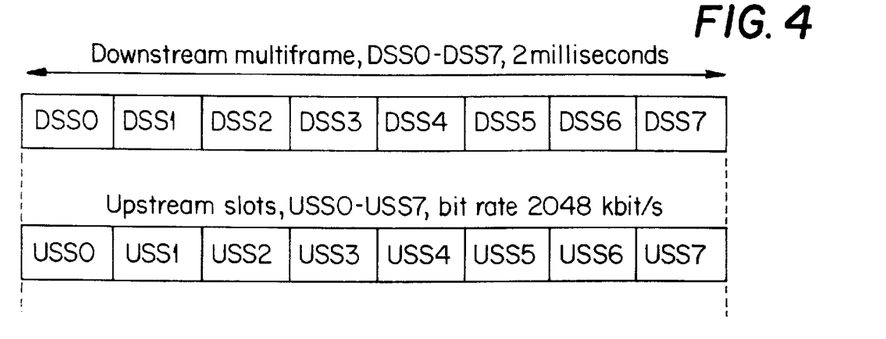
FIG. 4 shows downstream and upstream time slots viewed from the head-end.

Upstream frame structure and time slots, that is, the direction where the terminal equipment sends information, frame structure and time slots to the network are examined now. Upstream transmission rate may be 2048 kbit/s or 256 kbit/s. An upstream signal is formed of 63 byte frames and after the frame there is an empty guard byte. FIG. 4 shows upstream time slots, indicated by USS0, . . . . USS7. The length of an upstream time slot has to be such that it fits inside a downstream time slot, that is, it is the same as or shorter than the upstream time slot. For the sake of clarity, a downstream multiframe has been described at the top of the figure, upstream time slots in the middle when the bit rate is 2048 kbit/s, and upstream at the bottom when the bit rate is 256 kbit/s which low bit rate is caused by sending only bits of one time slots, that is, 63 bytes in the duration 2 ms of the multiframe. The terminals have to take propagation delay into consideration in the transmission so that the head-end (FIG. 1) will see the upstream and downstream time slots exactly as shown in FIG. 4.

In the system, there are 1 to 4 upstream OOB control channels for one out of band control channel OOB (Out of Band Channel) if the bit rate is in both directions the same 2048 kbit/s, or 1 to 32 upstream control channels if the upstream bit rate is 256 kbit/s. It is also possible that there are both 2048 kbit/s and 256 kbit/s control channels in the upstream. In that case the downstream control channel controls the timing and access of the upstream control channels associated with it.

In the upstream and downstream frame structures explained above information may be transmitted in ATM cells of UNI type (user-network interface). At the ITU-T, it has been agreed that an ATM cell consists of a header of 5 bytes and an information portion of 48 bytes. The header contains in the user-network interface seven fields, the first of which fields is a 4-bit flow control field GFC which is used in the flow control of varying services together with flow control functions of an in-house network. Other fields are e.g. virtual path identifier VPI and virtual channel identifier VCI.

An ATM cell in downstream is placed in the payload of two consecutive frames as shown in FIG. 3B for which reason two consecutive frames, in which the ATM cell is transmitted, are logically referred to as time slot DSS.

Figure 5A:
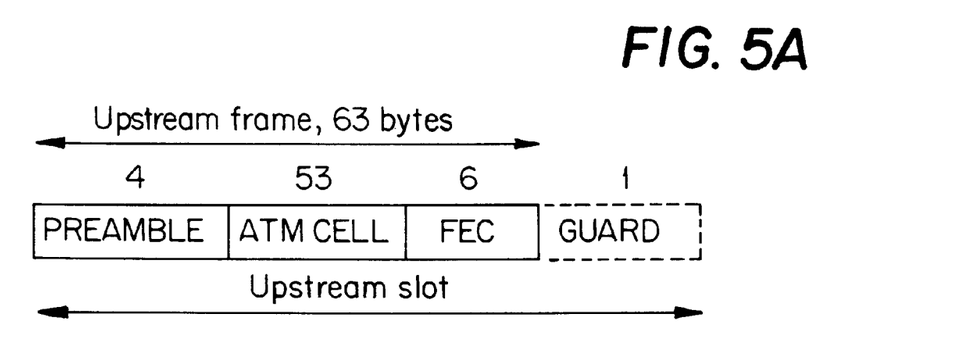
FIGS. 5A and 5B show insertion of an ATM cell in an upstream time slot.

In upstream, where the frame is 63 bytes, an ATM cell can be transmitted in the frame as in FIG. 5A in which there is at the beginning a preamble of 4 bytes, after this the ATM cell as a whole sent by the terminal and last an error correction field FEC of 6 bytes. The duration of one byte is reserved as guard time.

It has been proposed in advanced systems similar to the one described above that the time slots in both directions are numbered consecutively 0, . . . 4095, after which numbering is started from the beginning. Two channels are presented for the upstream in one of which the access mode is Aloha, in which case all subscribers may send in any time slot. The network acknowledges the successful transmission by echoing on a downstream channel. On the second upstream channel the terminal is allocated the time slot intended only for it, which slot is valid continuously, for example, upstream time slots 2 and 200 are continuously available for the same subscriber. A disadvantage of this arrangement is that it is difficult to change the designated time slots flexibly and the terminal reserves a time slot even if there is nothing to be sent. The upstream access mechanism is therefore not very efficient.

The present invention relates to an effective upstream access mechanism of a control channel which is suitable for use in any data transmission systems where distinct frames or time slots may be found in the transmission of information.

The present upstream access method is characterized by. what is stated in the independent claims.

BRIEF DESCRIPTION OF THE INVENTION

Problems associated with prior art solutions can be solved according to the invention in such a manner that the terminals are allocated specific grant numbers (Grant_ID), one or more per terminal, by signalling messages. A network equipment sends grant numbers relating to each upstream time slot. One grant number is associated with a grant to send information in the corresponding upstream time slot, that is, one ATM cell included in one or more virtual ATM channels. The grant number relates to a time slot which, when viewed from the network equipment, is later than the grant number in question, for example six time slots later. The terminal takes into consideration the propagation delay in downstream and upstream when identifying the time slots.

The network equipment sends grant numbers at a predetermined rate to each terminal or it sends grant numbers based on how many transmissions, such as ATM cells, the terminals report are queuing for transmission. Several ATM channels may be associated with each grant number at the same priority. Reporting on the length of the queues takes place by means of four bits of the GFC field in an ATM cell. The report relates to the grant number allocated to the upstream time slot in question.

The grant number may be allocated to one constant rate ATM channel, such as a speech channel if access delay is to be minimized. In that case the speech coder (A/D converter) is synchronized with the rate of the incoming grant number.

The method of the invention simplifies the terminal equipment as it has to monitor only the grant numbers allocated to it. The invention allows a fast reacting and capacity saving access for ATM channels whose need for capacity varies a great deal. The invention allows a small access delay for a speech channel.

In the following, the preferred embodiment of the invention will be explained in more detail by means of the appended schematic figures, wherein.

PREFERRED EMBODIMENT OF THE INVENTION

In accordance with the invention, terminals are allocated specific grant numbers (Grant_ID), one or more per terminal in frames of downstream time slots. Four grant numbers are sent in each time slot s and thus an identifier identifying its location time slot is associated with a grant number. The grant number also contains an identifier identifying its upstream channel u on which the terminal may send. One grant number is associated with a grant to send information in the corresponding upstream time slot, e.g. one ATM cell included in one or more virtual ATM channels. The time slot corresponding to the grant number is some predetermined time slot situated later than the time slot containing the grant number in question when viewed from the network equipment, here e.g. an upstream time slot six time slots later. Therefore if Grant_ID is sent to the terminal in a downstream time slot s=0, the terminal may send in upstream time slot s=6. The grant number value indicates for which use the referred upstream time slot is intended.

Grant numbers Grant_ID are sent in a 7 byte CONTROL field of downstream DSS time slot. Four types of grant numbers may be transmitted in a field and the following five sub-fields are thus determined for a field:

| Grant_ID (s, 0) | Grant_ID(s, 1) | Grant_ID (s, 2) | Grant_ID(s, 3) | SPARE BYTE |
|---|---|---|---|---|
| (12 bits) | (12 bits) | (12 bits) | (12 bits) | (8 bits) | where s indicates a time slot and thus acquires one of the values s=0, . . . 7.

Spare byte may be used for error detection/correction of control information carried by the downstream signal.

The values of these sub-fields have the following meanings:

Grant_ID(s,u)=0 indicates that the time slot of upstream channel u associated with the grant number time slot is not granted to any user, Grant_ID(s,u)=1 indicates that the time slot of upstream channel u associated with the grant number time slot is used for delay ranging, Grant_ID(s,u)=2 indicates that the time slot of the upstream channel u is granted to all terminals, that is, the time slot is so-called slotted Aloha, Grant_ID(s,u)=3–4095 indicates that upstream time slot associated with the grant number time slot is reserved only for one terminal for upstream transmission. (This Grant_ID value is thus the same as the individual identity number of some specific terminal.) If each terminal is allocated only one Grant_ID value, there may be 4,093 terminals in the network.

The indication s is time slot number s=0–7 and u is one of the values u∈0,1,2,3. One downstream channel may control four upstream channels and the channels are indicated by numbers 0, 1, 2 and 3.

A two byte Reed-Solomon word may be inserted in a two byte long Forward Error Correction field in FIG. 3A.

When the terminal sends in time slot s assigned to it in grant number Grant_ID, it may, of course, turn out that the message will not be received faultlessly at the destination. In that case the network reports this to the terminal in time slot $(s+2)_{Mod8}$. For this reason, in accordance with the invention, $S_{an}$ bits in G.704 frame, FIG. 2A, and thus also in multiframe, FIG. 2B, are indicated for convenience by letter Rn and the following meaning is provided:

bit R4 (=$S_{a4}$) is reserved and permanently set to 1;
bit R5 (=$S_{a5}$): Error_indication (s,u)
bit R6 (=$S_{a6}$): Error_indication (s,u)
bit R7 (=$S_{a7}$): Error_indication (s,u)
bit R8 (=$S_{a8}$): Error_indication (s,u)

where s is a time slot number 0, . . . 7 and u is an upstream channel u=0, . . . , 3.

When in some downstream time slot the value of Error_indication (s,u) of s is 0, it indicates that there has been an error in the information sent in the time slot of upstream channel u associated with this time slot. The terminal receives the information and may send again. If Error_indication (s,u) value is 1, it indicates that the reception has been faultless.

After having received the grant number Grant_ID(s,u) mentioned above, the terminal may send and receive information of the faultless arrival of the transmission by a R bit value of the frames of the downstream time slot. The terminal may send its information either in a frame structure of FIG. 5A or alternatively, in a structure of FIG. 5B according to one feature of the invention. It differs from the structure of FIG. 5A in that the error correction field has been shortened to 4 bytes and a new field GR of two bytes in length has been formed. Its first four bits contain a report of queue length. The terminal reports the Grant_ID(s,u) value by means of the remaining 12 bits. This structure is very useful when the terminal wishes to report to the network after a transmission break that it has something to send. The utilization of fields to that effect will be explained below in connection with the description of the access methods.

Figure 6:
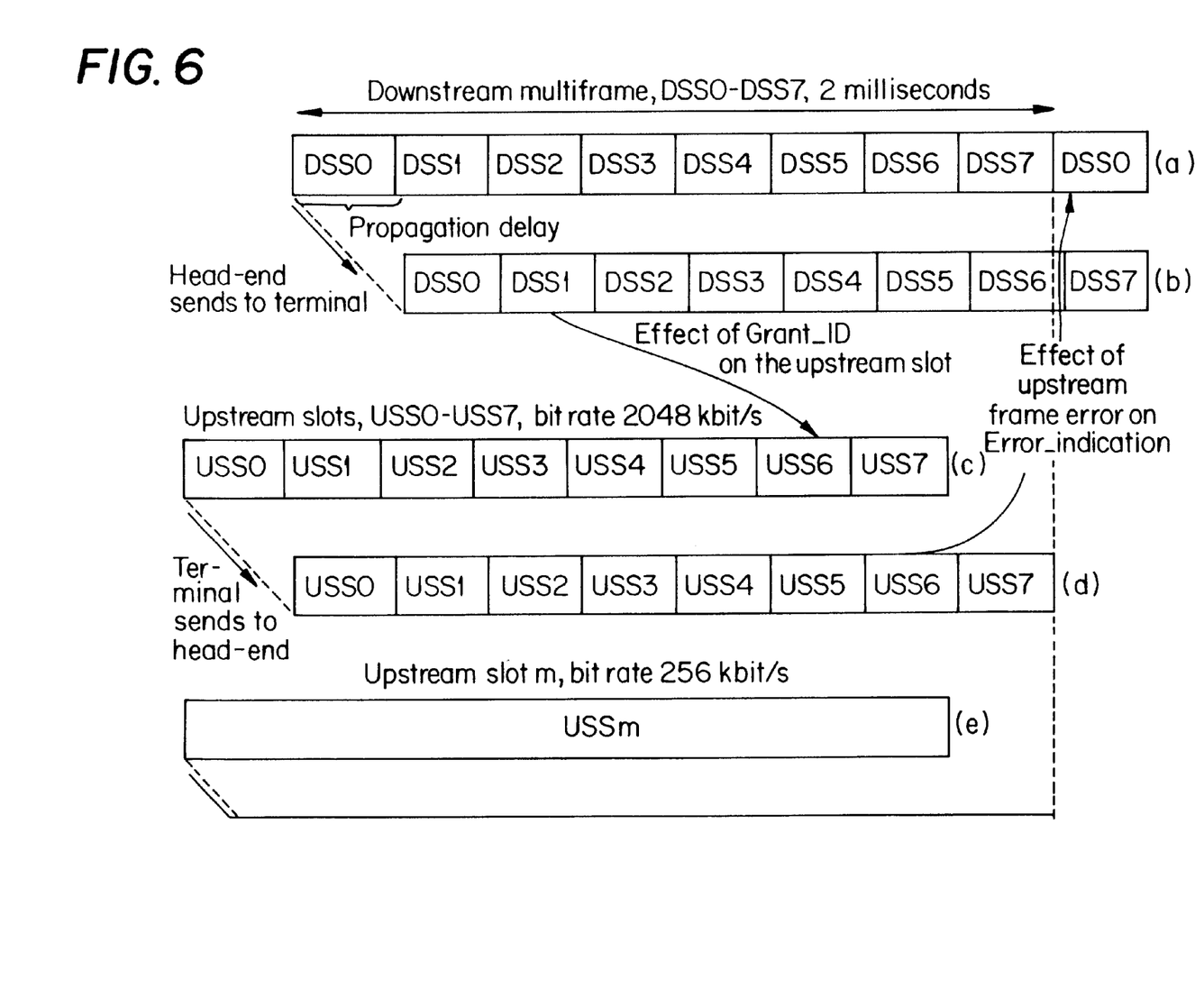
FIG. 6 shows the relation between grant number/error indication time slot and upstream time slot.

Grant_ID(s,u), Error_indication(s,u) and upstream time slots are proportioned to one another as illustrated in FIG. 6. A 2 Mbit/s downstream channel may control at most four 2 Mbit/s upstream channels. Because of propagation delay, the terminal should advance its transmission so that frame (a) to be sent and frame (d) or (f) to be received at the head-end will start at exactly the same moment. Grant_ID(s,u) inserted in a specific time slot s (s=1, . . . 7) controls the access of the terminal to the time slot of upstream channel u which is temporally six time slots away from Grant_ID (s,u) time slot. In step (a) of FIG. 6 the downstream frame is viewed at the head-end and in step (b) the same frame is viewed at the terminal. The terminal detects from the frame (b) it has received that Grant_ID(0,u) has been sent to it in time slot DSS0, wherefore it knows that it has a grant to send in time slot USS6 of the upstream frame. It sends an ATM cell in frame (c) whose transmission has been advanced by timing advance. The headend sees the frame (c) temporally as frame (d) and checks if the information sent in time slot USS6 is faulty or faultless. Based on the result, it sets the Error_indication (s,u) bit (R bit) in time slot DSS0 either to zero (error) or to one (no error). The terminal receives the information and on the basis of it either resends the ATM cell or sends the next ATM cell.

If the upstream channels are 256 kbit/s channels, the downstream channel can control at most 32 of these channels. Grant_ID(s,u) inserted in a time slot s (s=1 , . . . 7) of a specific multiframe m then controls the access of the terminal not to the next time slot (m+1) of channel u but to the following time slot (m+2). Correspondingly, Error_indication (s,u) inserted in downstream time slot s of multiframe m reports an error in the transmission which has occurred in (the last but one) time slot (m-2).

In the upstream there may be both 2048 kbit/s and 256 kbit/s channels however so that in place of one 2048 kbit/s channel there may be eight 256 kbit/s channels.

As for allocation of Grant_ID and VPI/VCI values of ATM cells, it is advantageous that they are completely unique within the downstream channel and all the upstream channels controlled by it. In case the number of the terminals is very high, it may be satisfactory that Grant_ID and VPI/VCI values are unique only within one upstream channel.

By means of grant numbers Grant_ID of the invention, the terminal is reported in which upstream time slot it may send information, e.g. ATM cells. The following describes the mechanisms by which the terminal accesses an upstream time slot, that is, acquires a grant number Grant_ID. There are four distinct access methods: 1) slotted Aloha, 2) access on the basis of grant numbers sent on a constant frequency, 3) access on the basis of grant numbers sent on a variable frequency but at a specific base rate, and 4) access on the basis of grant numbers sent on a variable frequency but without a specific base rate.

The slotted Aloha access is controlled by the network. It allocates upstream time slots by sending in downstream time slot s a grant number of a form Grant_ID(s,u)=2. All terminals are then allowed to send in upstream time slot associated with time slot s (e.g. send 6 time slots later than the reception time slof of the grant number). When the willing terminals are sending, congestion may build up. The terminal is uncertain whether the access has been successful. It will be ascertained two time slots later in downstream time slots $(s+2)_{Mod8}$ where the bits of the first byte R in the second frame of the time slot indicate if the reception has been faulty, in which case Error_indication (s,u)=0, or faultless, in which case Error_indication (s,u)=1. If an error has been detected in the reception, the terminal tries to resend after a certain period of time. Only after the terminal has had a successful transmission of an ATM cell, it is allowed to use the next grant number Grant_ID=2 assigned to the same upstream channel.

The slotted Aloha access is suitable for terminals with little need for upstream transmission. Slotted Aloha is not efficient enough for terminals with much to send, in which case they have to use access granted according to steps 2 and 3 above.

According to the second access method, that is, when the access takes place on the basis of grant numbers sent at a constant rate, the network allocates corresponding grant numbers at regular intervals so that the terminal can send cells of multiple ATM channels in corresponding upstream time slots. This access method is simple, it prevents collisions and provides a guaranteed bandwidth for the terminal. Grant_ID may be allocated to one virtual channel if the data source of the terminal, such as a voice encoder, should be synchronized with the grant rate to eliminate delay. If Grant_ID was allocated at irregular intervals, various delays would be produced when speech parameters are sent.

The third access method of a transmission time slot of a terminal is at a variable rate but on the basis of the grant numbers sent at a certain base rate. In this type of access method, one Grant_ID is allocated to all ATM channels of the terminal with the same priority. The terminal may send ATM cells with the same priority in corresponding upstream time slots. The network allocates grant numbers Grant_ID at a constant base rate but if the terminal needs more cells it requests them by reporting to the head-end the number of the ATM cells in queue. The reporting takes place in the time slot reported to the terminal by Grant_ID. It should be noted in this method that cells with a differing priority form a group and each group is allocated a specific Grant_ID.

The terminal reports the number of the ATM cells in queue by the first four bits of flow control field GFC in the ATM cell header. The reporting concerns the Grant_ID value which is associated with the upstream time slot where the report is transmitted. The report contains information on how many cells there are in the queue. The cell carrying the report is not included in the queue. The following table is presented for interpreting the reported value in the flow control field GFC:

| Value of GFC field (dec.) in ATM cell | Queue length in number of cells |
| --- | --- |
| 0 | 0 cells |
| 1 | 1 cell |
| 2 | 2 cells |
| 3 | 3 cells |
| 4 | 4 cells |
| 5 | 5 cells |
| 6 | 6 cells |
| 7 | 7 cells |
| 8 | 8 cells |
| 9 | 9 cells |
| 10 | 10 cells |
| 11 | 11 cells |
| 12 | $\geq 12$ cells |
| 13 | $\geq 16$ cells |
| 14 | $\geq 64$ cells |
| 15 | $\geq 256$ cells |

As can be seen, correspondence is linear as far as numeral 11. Correspondences in numerals 12 to 15 are non-linear because the intervals are indicated. When the terminal sends a cell in this access type, it always has to report the number of the cells in queue in each cell. The basic rate of the Grant_ID transmissions should be sufficiently high so that the terminal does not have to wait long for sending the report. To avoid the need for a mapping table from Grant_ID to the priority on the network side, the network allocates, when required, the Grant_ID values so that a specific number of bits indicated by Grant_ID value, e.g. 2 bits, will immediately indicate the priority. Four priorities may be indicated by two bits.

The fourth access method is access on the basis of grant numbers sent on a variable frequency and without any base frequency. The network provides Grant_ID values only on the basis of queue length reports sent by-the terminal. The terminal may send ATM cells of several ATM channels in corresponding time slots. The cells have the same priority. In this access type the terminal has one ATM virtual channel or a group of ATM virtual channels using the time slot reported in the grant number Grant_ID. The access method is suitable for very bursty ATM channels when there are idle periods between transmission periods. After an idle period, there is a situation when the network does not provide any Grant_ID values and the terminal has assembled cells in queue. Then there are two alternative procedures:

1) The terminal sends in the time slot of the first cell in the queue which is allocated by Grant_ID value 2. The time slot is then slotted Aloha. The terminal uses a frame structure of FIG. 5B. It inserts a queue length report GR in the first four bits of the field and its Grant_ID value X, with which the report is associated, it inserts in the remaining 12 bits of the GR field.

2) The terminal sends the first cell of the queue in a time slot indicated by Grant_ID value Y. The terminal uses also in this case the frame structure of FIG. 5B. It inserts a queue length report GR in the first four bits of the field and its Grant_ID value X, with which the report is associated, it inserts in the remaining 12 bits of the GR field. In the GFC field of the ATM cell included in the frame the terminal reports the queue length associated with Grant_ID value Y.

Figure 5B:
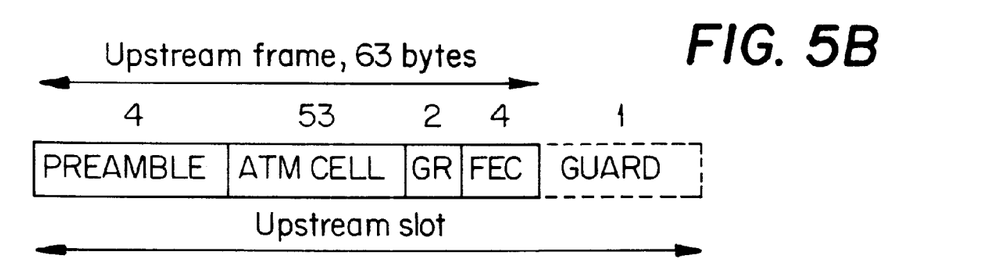

The network recognizes that the frame structure is as in FIG. 5B and it finds the report in the GR field and possibly the report in the GFC field. After this, the network provides the requested Grant_ID values X (and Y). After having received the values, the terminal starts to send the cells in the assigned upstream time slot. The ATM cells after the first cell are sent in the frame structure of FIG. 5A.

Figure 7:
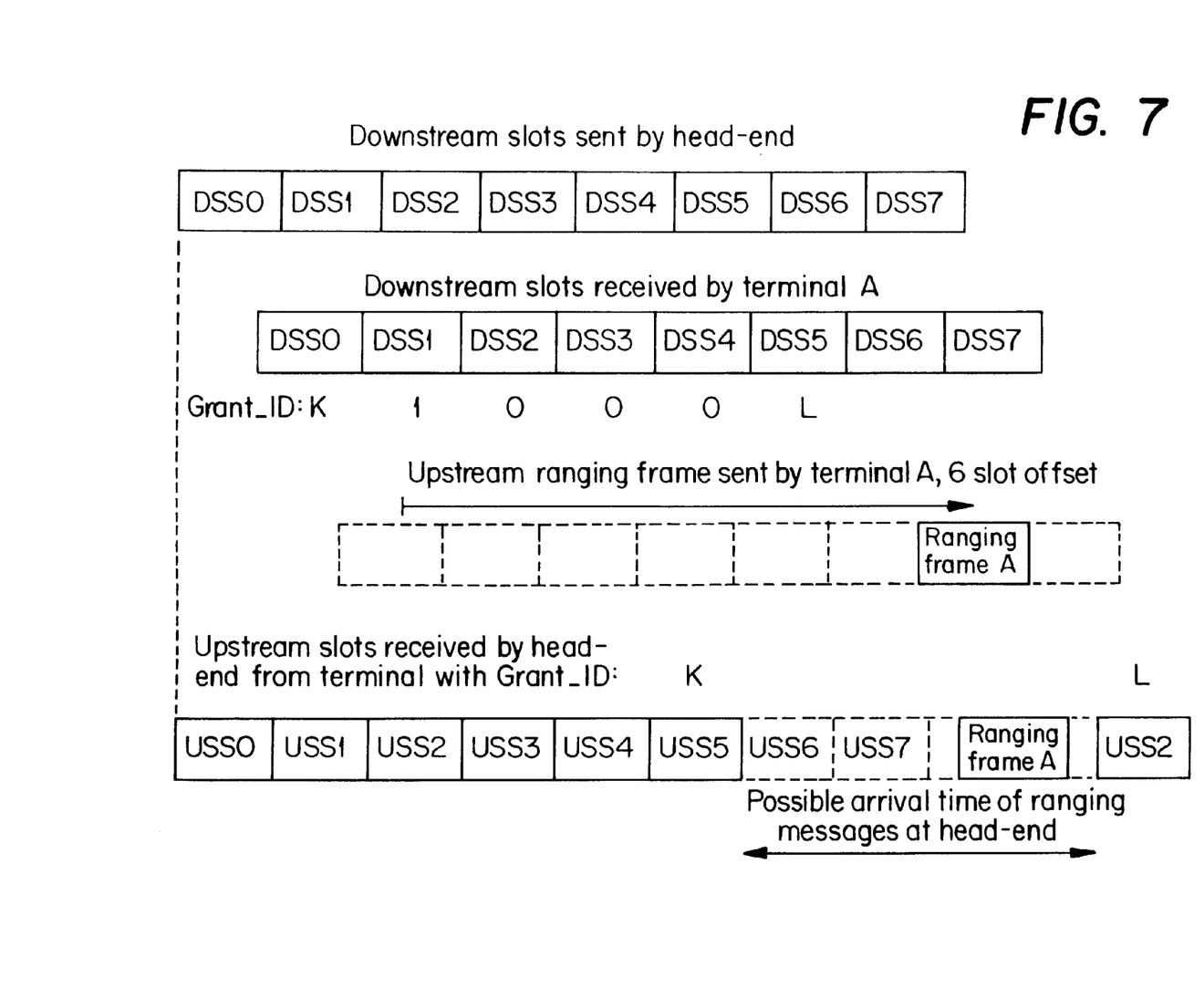
FIG. 7 shows the timing principle when the rate is 2 Mbit/s.

The use of Grant_ID is now explained in delay correction performed by the terminal. In order to obtain correct timing, the delay and attenuation caused by the terminal/network module distance should be corrected. Reference is made to FIG. 7. The network reports to the terminal in grant number Grant_ID=1 sent in time slot DSS1 which is the time slot used for ranging delay. The terminal requiring timing ranging recognizes the time slot where Grant_ID=1 and sends a specified ranging frame six time slots later. The frame contains the address of the terminal. The following one or more DSS time slots are not allocated to anyone, Grant_ID=0, whereby no terminal is allowed to send so that the frame of the sending terminal will arrive undisturbed at the head-end. The head-end measures the time difference in the ranging frame and sends the delay correction values to the terminal so that it can modify its timing. The steps are repeated until the required timing accuracy is reached, after which the network sends information of this to the terminal.

Figure 8:
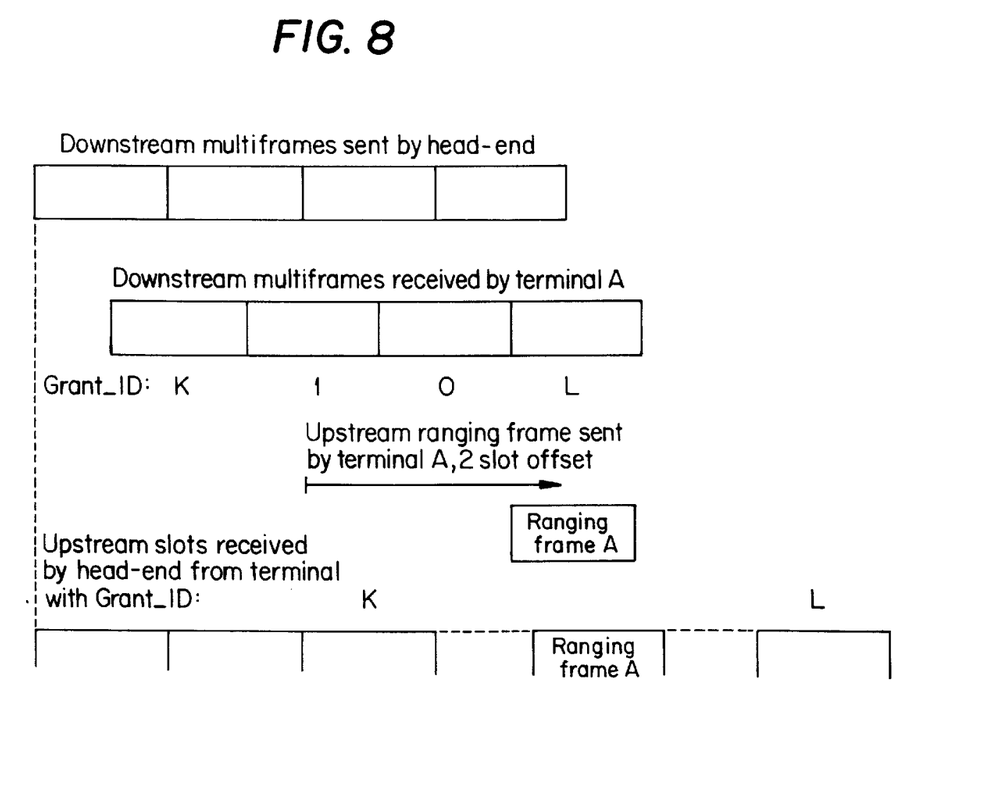
FIG. 8 shows the timing principle when the rate is 256 kbit/s.

If the rate of the upstream channel is 256 kbit/s, the timing of the channel is as in FIG. 8. The network allocates to the terminal a time slot used for upstream ranging by grant number Grant_ID=1. The terminal recognizes the time slot where Grant_ID=1 and sends a ranging frame two time slots later. One or more of the following DSS time slots are not allocated to anyone, Grant_ID=0, whereby no terminal is allowed to send, in which case the frame of the sending terminal will arrive undisturbed at the head-end. The head-end measures the timing difference of the frames and sends a delay correction value to the terminal. Measuring is repeated until timing is correct.

It has been mentioned above in the specification that a 2 Mbit/s downstream channel may control four 2 Mbit/s upstream channels. By grouping upstream channels into one logical channel, higher rates can be obtained. When all four upstream channels form one logical channel, a 8192 Mbit/s channel is produced. The access protocol is still Grant_ID and Grant_ID and VPI/VCI values have to be unique within a group. The terminals transfer cells to different 2 Mbit/s channels on the basis of Grant_ID's. The cell order within the group is mapped from the Grant_ID order of the downstream channel.

Upstream transmission rate is so high that the field reporting queue length has to cover a greater range than when transmitting 2 Mbit/s. In this case there are two possible procedures:

1) The terminal divides the actual queue length by two, for example. The division is made by transferring the format of the binary number representing queue length to the right and by discarding the last LSB bit. The network multiplies the received value by two and transfers zero into an LSB bit. The inaccuracy of queue length report is then 0 or 1 cells when the value is between 0 and 22.

2) Only the frame structure of FIG. 5B is used in the queue length report. The queue length report derives from the GR field e.g. five bits and Grant_ID the remaining 11. The report is accurate from values 0 to about 28 cells.

When all the upstream channels are scaled into one to form one logical channel, a 8192 Mbit/s channel will be produced, the access being controlled by all Grant_ID's of the downstream 2 Mbit/s channel. The cell order on 8192 Mbit/s channel is mapped from the order of downstream channel Grant_ID. The Grant_ID(s,u) controls the access to time slot $USS[4(s+6)+u]_{Mod32}$. The error indicator Error_indication(s,u) indicates an error found in upstream slot $USS[4(s-2)+u]_{Mod32}$.

Even greater upstream rates can be attained by shortening the length of the Grant_ID to 8 bits, whereby 6 Grant_ID sub-fields are obtained in the same time slot. Then the upstream maximum capacity controlled by downstream will be 6×2048 kbit/s=12288 kbit/s.

In the arrangement of the invention, if a cable is the physical path, it makes necessary the use of a separate active network terminal which adapts some other standard ATM connection to the cable.

The method of the invention is suitable for use in fibre/coaxial cable systems (Hybrid Fibre Coax) where transmission rates 256 kbit/s, 2048 kbit/s and 8192 kbit/s are used and where the access mode is slotted access. The arrangement is suitable for use as well in other networks, such as optical and wireless networks.

It will be evident to those skilled in the art that the basic idea of the invention may be realized in various ways. The invention and its embodiments are therefore not restricted to the examples described above but they may vary within the scope of the claims.

What is claimed is:

1. A method for allocating control time slots to a plurality of terminal equipment in a multipoint system based on time-division data transmission, the system comprising network equipment and the terminal equipment, said method comprising:

sending control information by the network equipment to the terminal equipment in time slots of a downstream channel frame, the control information including specific grant numbers having grant number information that reports use of time slots of an upstream channel frame controlled by said downstream channel frame, said upstream time slots having a predetermined temporal relation to the downstream time slots;

receiving the grant numbers by the terminal equipment; and sending information by the terminal equipment to the network equipment in the upstream time slots associated with downstream time slots of the grant numbers.

2. The method according to claim 1, wherein, when a grant number is a first predetermined value, no terminal equipment is allowed to send information in an upstream time slot associated with a transmission time slot of said grant number.

3. The method according to claim 2, wherein, when a grant number is a second predetermined value, an upstream time slot associated with a transmission time slot of said grant number is used for measuring propagation delay between the network equipment and the terminal equipment so that the terminal equipment requiring timing adjustment sends a specific measurement frame in said upstream time slot.

4. The method according to claim 3, wherein, when the network equipment has sent a grant number with the second predetermined value in some time slot of a frame of the downstream channel, the network equipment immediately sends a grant number with the first predetermined value at least in one of the following time slots, whereby the network equipment forms a time window during which the terminal equipment is only allowed to send a measurement frame.

5. The method according to claim 1, wherein, when the grant number is a third predetermined value, each of the terminal equipment has a right to send information in an upstream time slot associated with a transmission time slot of said grant number, whereby the upstream time slot is a slotted Aloha time slot.

6. The method according to claim 1, wherein the terminal equipment has a right to send information only when the terminal equipment has received a unique grant number authorizing transmission.

7. The method according to claim 6, wherein the network equipment reports the unique grant number to the terminal equipment when the terminal equipment is initiated.

8. The method according to claim 6, wherein the network equipment sends to the terminal equipment a unique grant number authorizing transmission at regular intervals, whereby the terminal equipment has a constant bit rate available upstream.

9. The method according to claim 6, wherein an upstream channel including the upstream channel frame is a speech channel and a speech coder of the terminal equipment is synchronized with a transmission frequency of the unique grant number in such a manner that a data block produced by the speech coder including encoded speech is sent immediately in an upstream time slot.

10. The method according to claim 1, wherein several differing unique grant numbers may be assigned to the terminal equipment, the terminal equipment being authorized to send information in upstream time slots associated with the grant numbers, the terminal equipment sending in a same upstream time slot only information having equal priority.

11. The method according to claim 8 or 10, wherein, when the terminal equipment requires more time slots, the terminal equipment requests in an upstream time slot associated with the unique grant number that the network equipment send grant numbers more rapidly.

12. The method according to claim 11, wherein the terminal equipment sends in an upstream time slot associated with the unique grant number a message to the network equipment containing a report on how much information is waiting for transmission at the terminal equipment, and in response to the message, the network equipment assigns unique grant numbers to the terminal equipment at a required frequency.

13. The method according to claim 12, wherein the report on the amount of information waiting in the time slot associated with the unique grant number is placed in a flow control field GFC of an ATM cell header included in the message.

14. The method according to claim 12, wherein the report on the amount of information waiting for transmission to a grant number other than one in the upstream time slot associated with said grant number is placed in a specific field included in the message and said other grant number is also reported in the field.

15. The method according to claim 5, wherein the terminal equipment sends in a slotted Aloha time slot a message to the network equipment including both a unique grant number of the terminal equipment and a report on how much information is waiting for transmission at the terminal equipment in the upstream time slot associated with the grant number, and in response to the message being faultlessly received, the network equipment assigns unique grant numbers to the terminal equipment at a required frequency.

16. The method according to claim 1, wherein several grant numbers are sent in one downstream time slot, each grant number controlling a different upstream channel by authorizing the terminal equipment to send in a time slot of an upstream channel frame.

17. The method according to claim 16, wherein one or more time slots of upstream channels are combined to form one high-rate logical channel.

18. The method according to claim 17, wherein the terminal equipment places information to be sent in time slots of the upstream channel frame in a same order in which the grant numbers are placed in the downstream time slots.

19. The method according to claim 3 or 6, wherein, when the network equipment has received the information sent by the terminal equipment, the network equipment informs the terminal equipment two time slots later whether the received information is faulty, in which case the terminal equipment carries out a retransmission.

20. The method according to claim 1, wherein said system is a cable TV system.

21. The method according to claim 1, wherein said system is an optical network.

22. The method according to claim 1, wherein said system is a wireless network.

23. The method according to claim 1, wherein said network equipment sends four grant numbers in each of the time slots of the downstream channel frame.

24. The method according to claim 1, wherein each of the time slots of the downstream channel frame includes a portion used to detect or correct errors in the control information sent by the network equipment.

25. A multipoint system based on time-division data transmission, comprising:

a plurality of terminal equipment; and network equipment configured to send control information to the terminal equipment in time slots of a downstream channel frame, the control information including specific grant numbers having grant number information that reports use of time slots of an upstream channel frame having a predetermined temporal relation to the downstream time slots, wherein the terminal equipment are configured to receive the grant numbers and send information to the network equipment in the upstream time slots associated with downstream time slots of the grant numbers.

* * * * *